(12) United States Patent
Griffin et al.

(10) Patent No.: US 11,097,395 B2
(45) Date of Patent: Aug. 24, 2021

(54) CHAMFERING LASER SURGICAL OPTICAL FIBER

(71) Applicant: Cyclone Biosciences LLC, Phoenix, AZ (US)

(72) Inventors: Stephen E. Griffin, Peoria, AZ (US); Brian Barr, Scottsdale, AZ (US)

(73) Assignee: CYCLONE BIOSCIENCES, LLC, Phoenix, AZ (US)

( * ) Notice: Subject to any disclaimer, the term of this patent is extended or adjusted under 35 U.S.C. 154(b) by 180 days.

(21) Appl. No.: 15/426,117

(22) Filed: Feb. 7, 2017

(65) Prior Publication Data

US 2018/0222005 A1  Aug. 9, 2018

(51) Int. Cl.
*B24B 19/22* (2006.01)
*G02B 6/26* (2006.01)
*G02B 6/25* (2006.01)

(52) U.S. Cl.
CPC .............. *B24B 19/226* (2013.01); *G02B 6/25* (2013.01); *G02B 6/262* (2013.01)

(58) Field of Classification Search
CPC ..... B24B 19/226; B24B 19/14; B24B 31/064; B24B 31/06; B24B 31/062; B24B 31/067; B24B 31/073; G02B 6/3863; G02B 6/25; G02B 6/262
See application file for complete search history.

(56) References Cited

U.S. PATENT DOCUMENTS

| | | | | |
|---|---|---|---|---|
| 3,975,865 A | * | 8/1976 | Lewis | B24B 19/226 |
| | | | | 451/359 |
| 5,291,570 A | * | 3/1994 | Filgas | G02B 6/3813 |
| | | | | 385/78 |
| 5,615,291 A | * | 3/1997 | Hayakawa | B24B 19/226 |
| | | | | 264/1.21 |
| 9,235,004 B2 | | 1/2016 | Bansal et al. | |
| 2008/0195085 A1 | * | 8/2008 | Loeb | A61B 18/18 |
| | | | | 606/3 |
| 2011/0015756 A1 | * | 1/2011 | Pawar | A61L 27/04 |
| | | | | 623/23.53 |
| 2011/0075973 A1 | * | 3/2011 | Dean, Jr. | B29D 11/00663 |
| | | | | 385/78 |
| 2012/0070115 A1 | * | 3/2012 | Langseth | G02B 6/14 |
| | | | | 385/29 |
| 2013/0089294 A1 | * | 4/2013 | Zimmel | G02B 6/3838 |
| | | | | 385/80 |
| 2013/0336618 A1 | * | 12/2013 | Danley | G02B 6/3854 |
| | | | | 385/78 |

* cited by examiner

*Primary Examiner* — Orlando E Aviles
*Assistant Examiner* — Joel D Crandall
(74) *Attorney, Agent, or Firm* — Yakov Sidorin; Quarles & Brady LLP

(57) ABSTRACT

A tool for chamfering cleaved tips of optical fibers. The tool including conical bores of relatively smooth and hard material terminate at a cylindrical bore that is slightly larger than the fiber core maximum diameter and a fiber centering bore that is slightly larger than the fiber coating maximum diameter. The tool provided such that when a cleaved fiber tip is inserted into the centering bore the sharp edge falls upon the chamfer that, when rotated relative to the fiber, gently grinds the edge to the chamfer angle. Chamfering cannot occur on the core face due to the absence of tool surface at this dimension.

7 Claims, 7 Drawing Sheets

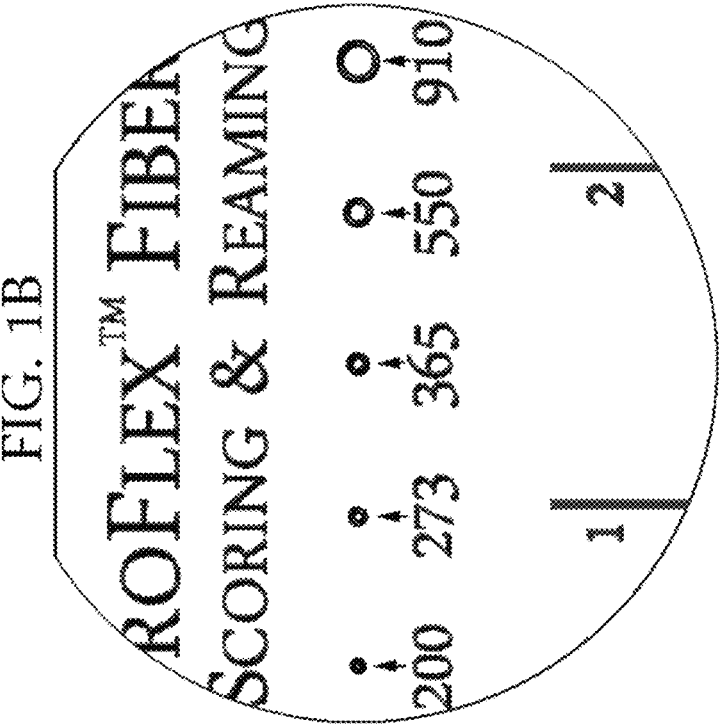
FIG. 1B
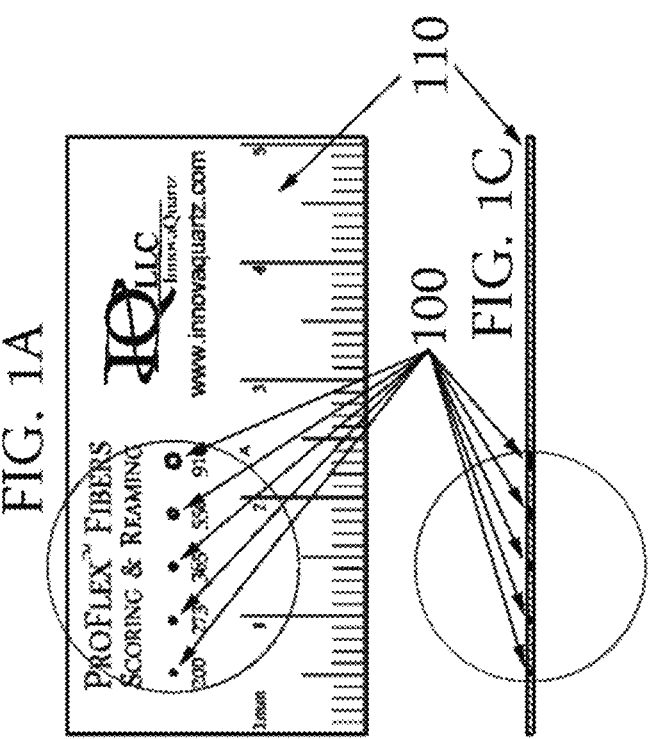
FIG. 1A
FIG. 1C
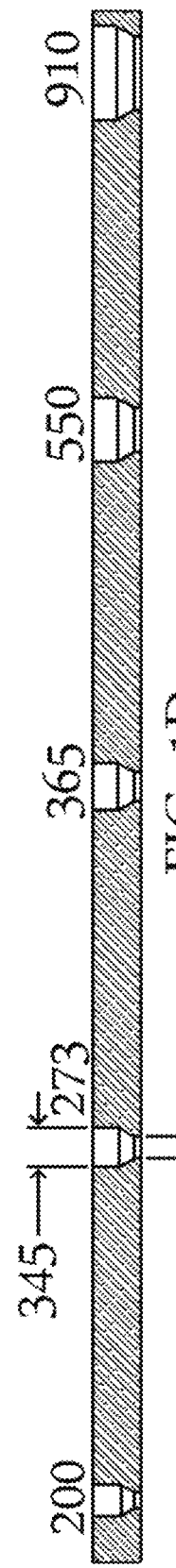
FIG. 1D

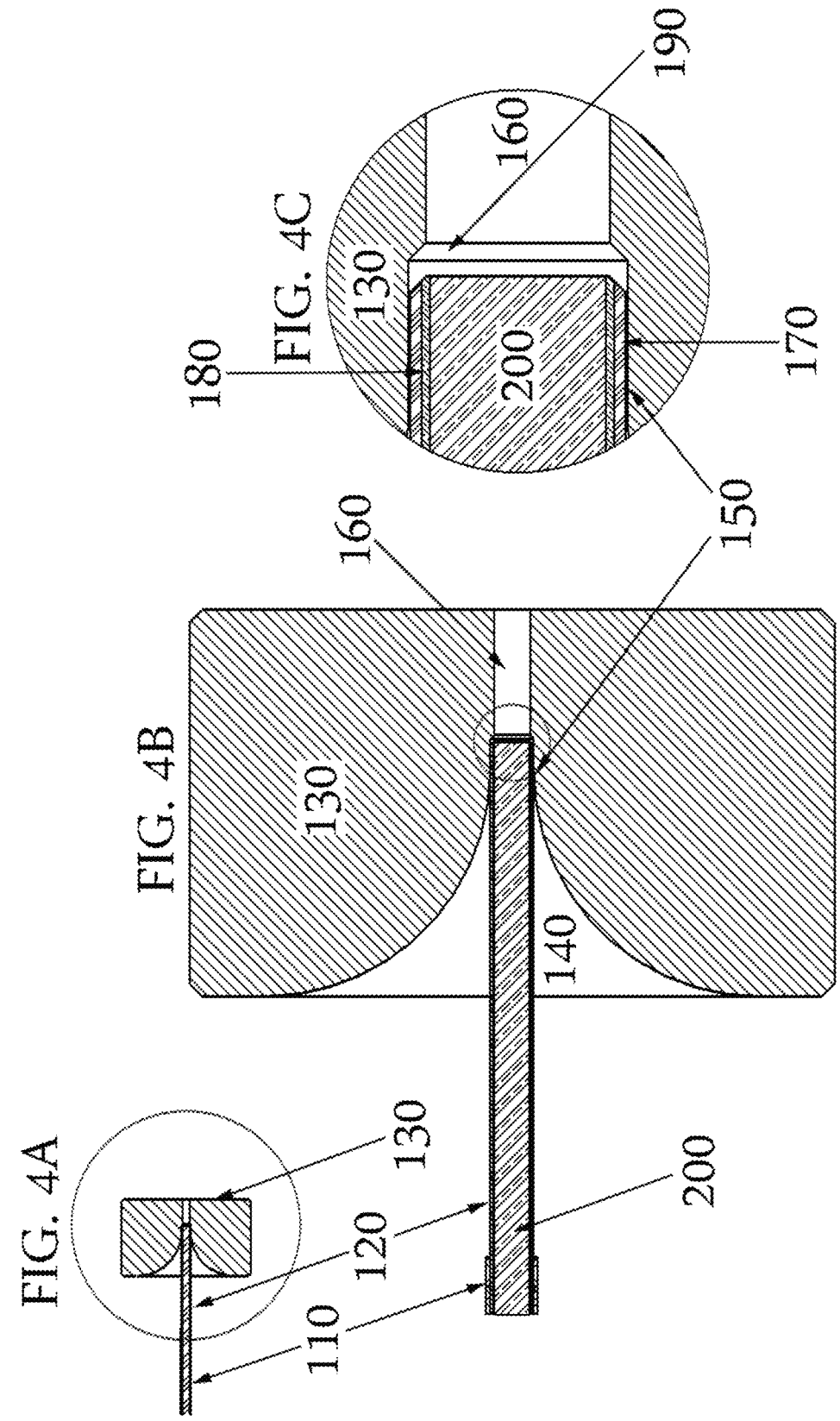

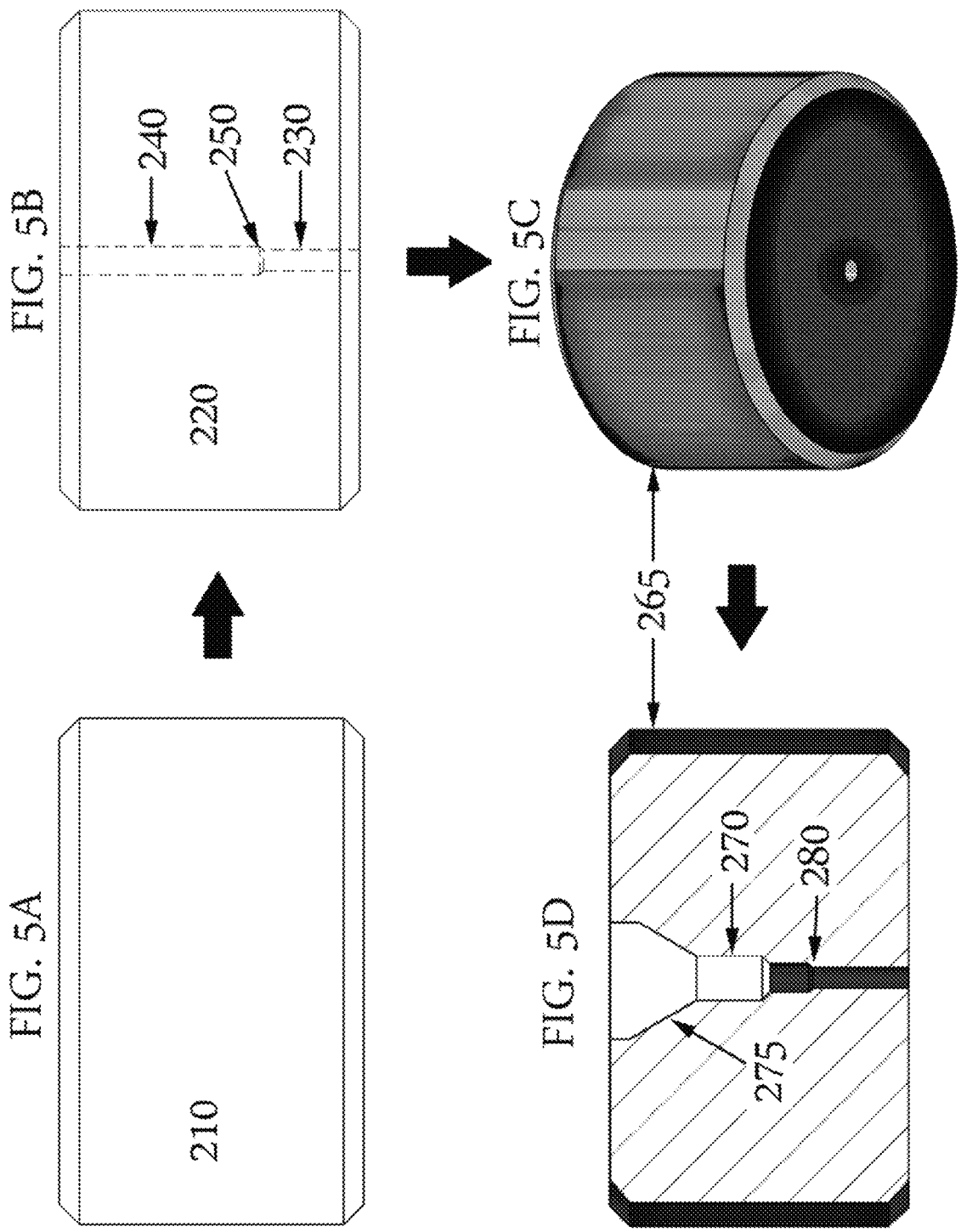

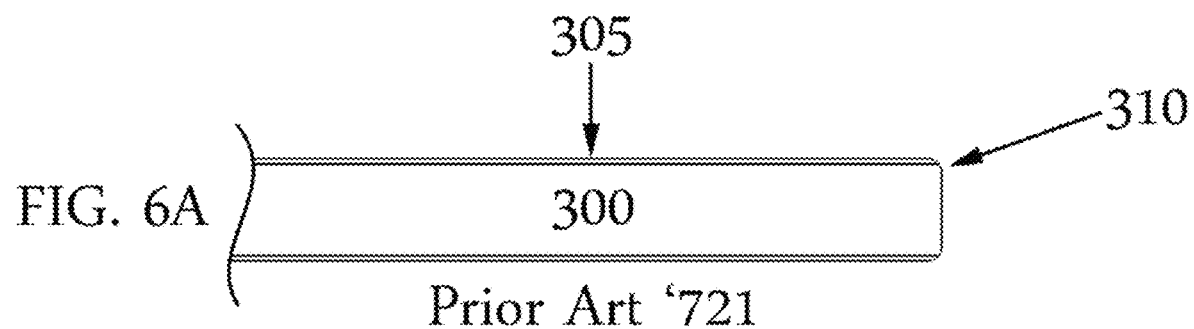
FIG. 6A
Prior Art '721
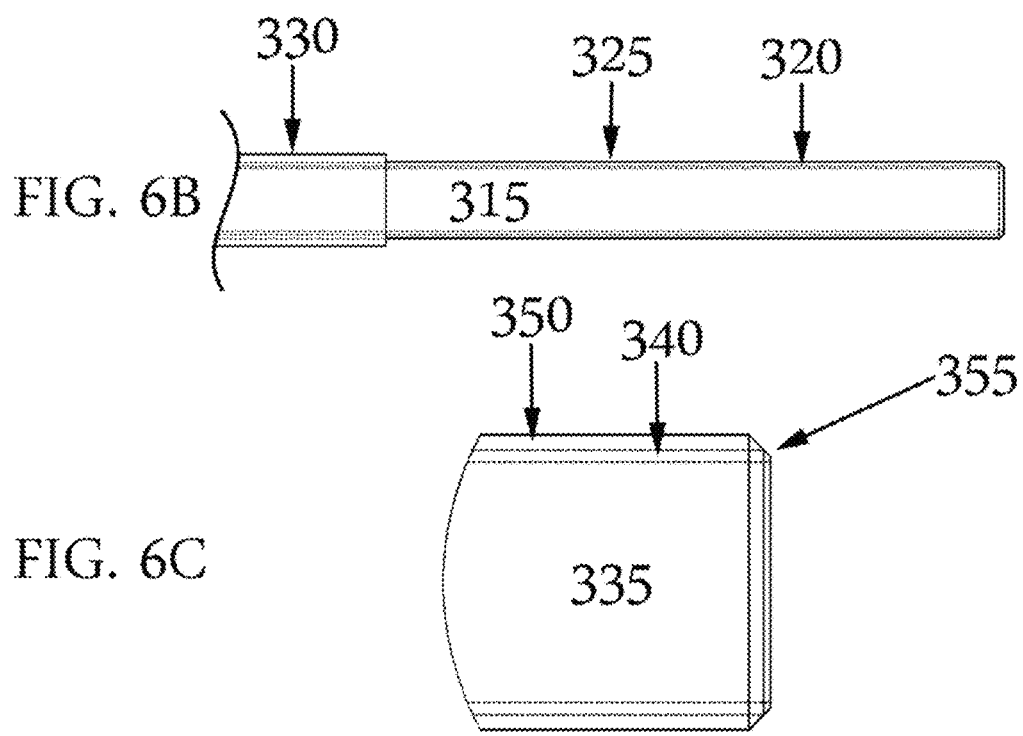
FIG. 6B
FIG. 6C

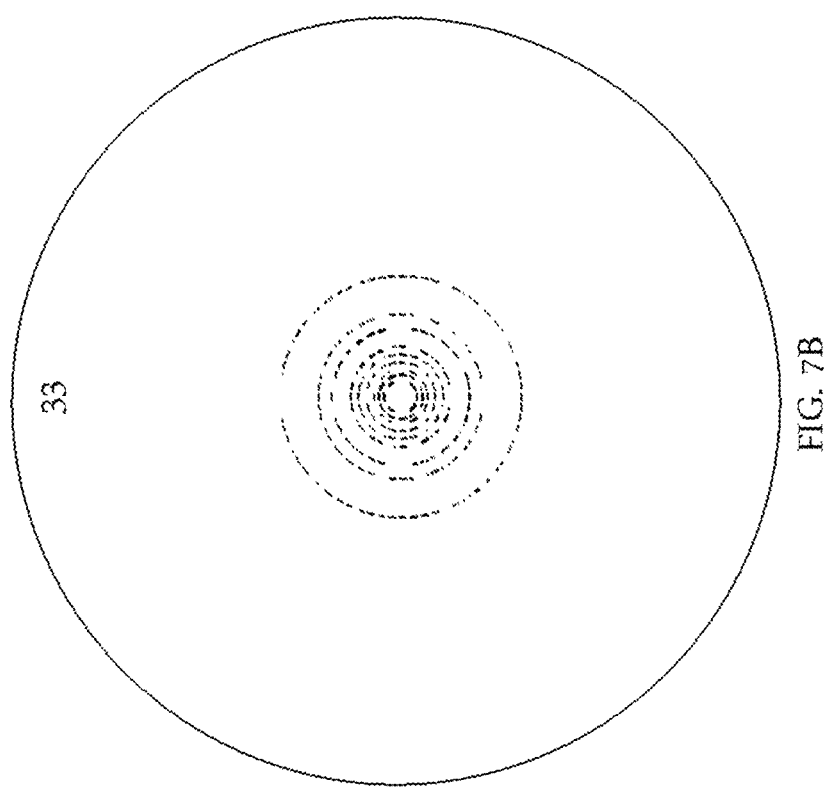
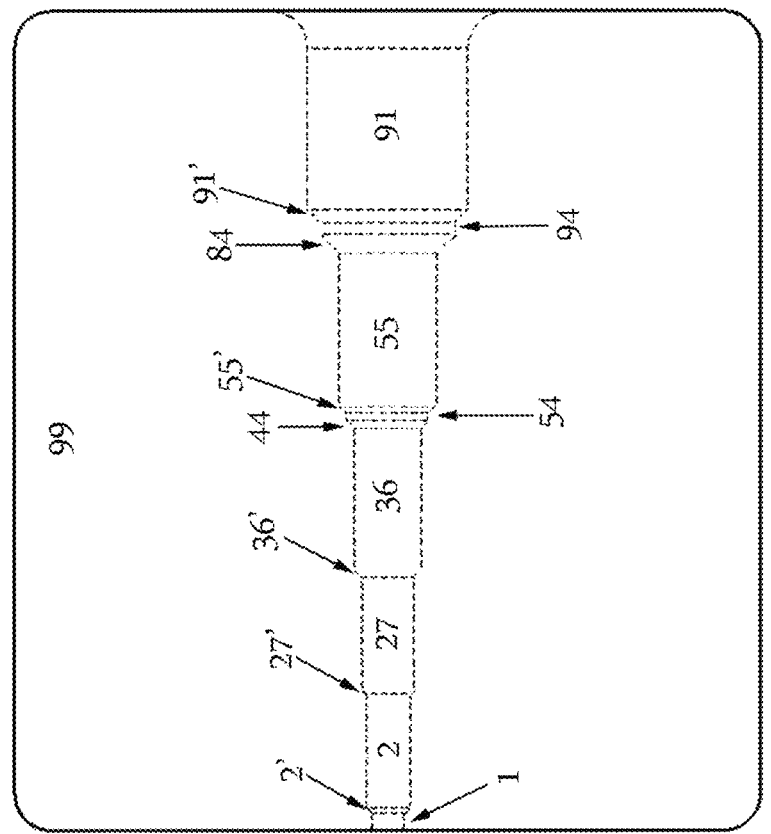
FIG. 7B
FIG. 7A

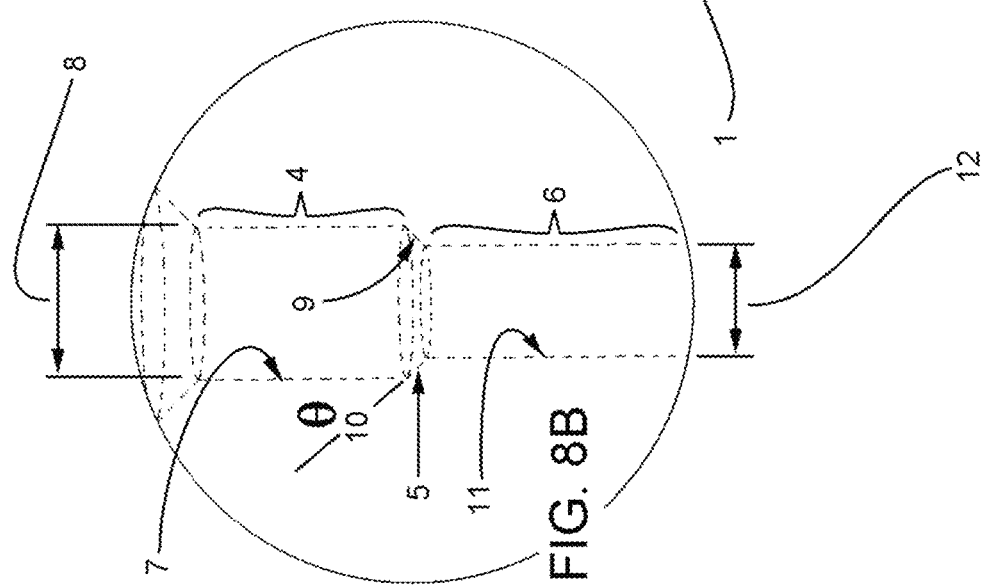
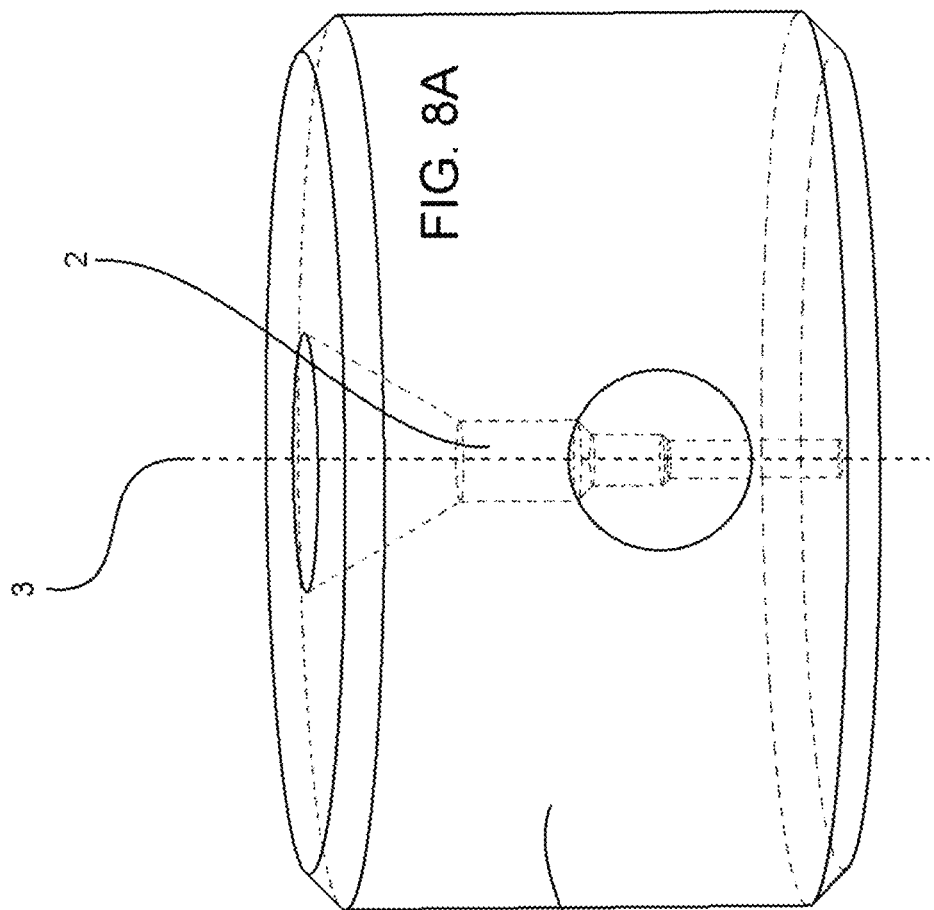

CHAMFERING LASER SURGICAL OPTICAL FIBER

FIELD OF THE INVENTION

This disclosure is directed to the removal of sharp glass edges from endoscopic optical fibers and tools for the removal.

BACKGROUND

Damaged endoscope working channel liners trigger more trips to the repair shop than any other wear and tear for these minimally invasive access instruments. "Bare" laser surgical fibers often have rounded edges when new (e.g. by laser polishing or by having ball lens tips). Reprocessing used fibers requires stripping the protective jacket (aka buffer), scoring the fiber and cleaving to produce a new, flat output surface. When used for surgery via endoscope access, such reprocessed fibers hang up within and damage working channel liners by gouging, pitting, and occasionally perforating this polymer liner.

In some surgeries (e.g. laser lithotripsy) some fiber tips rapidly 'burn back' and reduce the laser energy delivery efficiency of the device as much as 50%. Intraoperative reprocessing using sterile strippers and cleavers is a common practice for recovering fiber performance in such surgeries.

Chamfering the edges of a freshly cut laser surgical fiber, even outside the surgical suite, is not a simple task. The fiber includes an extremely hard (5.5 to 6.5 Mohs hardness) fused silica core ranging from 200 µm to 910 µm diameter with a very thin glass cladding layer (14 µm to 45 µm thick, fluorine-doped fused silica). The chamfering must be confined to this cladding layer to prevent distortion of the optical output from the fiber. Notably, any distortion of the fiber output (e.g., by a chamfer extending into the core) renders a reprocessed fiber noncompliant with FDA requirements; requirements that are unmet by many reprocessed fibers.

One example of chamfering a fiber is U.S. patent application Ser. No. 13/746,721 (and issued U.S. Pat. No. 9,235,004 Bansal, et al.) which teaches a method for cleaving and chamfering an optical fiber that involves removing a window within the fiber coatings with a laser, scribing the bare fiber within the window, applying tension to the fiber to cleave it, and then "chamfering" the cleaved end" . . . by applying heat from one of $CO_2$ laser, a plasma arc, a gas flame and a resistive coil. FIG. 2 within '721 ('004) depicts a filleted fiber tip where the fillet extends well into the fiber core and is reproduced herein as FIG. 6A.

SUMMARY

Conical bores of relatively smooth and hard material terminate at a cylindrical bore that is slightly larger than the fiber core maximum diameter and a fiber centering bore that is slightly larger than the fiber coating maximum diameter. When a cleaved fiber tip is inserted into the centering bore the sharp edge falls upon the chamfer that, when rotated relative to the fiber, gently grinds the edge to the chamfer angle. Chamfering cannot occur on the core face due to the absence of tool surface at this dimension.

One embodiment is a tool for chamfering large core, multimode optical fiber that includes a first, fiber centering bore with a diameter slightly larger than the largest fiber diameter possible at the cladding, or slightly larger than the largest fiber diameter possible primary coating diameter within the tolerance range, a second, chamfer stop bore with a diameter that is slightly larger than the largest core diameter possible for the fiber with the tolerance range and joined to the first bore by a chamfer between the different bore diameters, upon which surface the sharp edge of a cleaved fiber is ground smooth under rotation.

Another embodiment is a chamfering tool that includes a chamfering body defining a bore that is centrosymmetric about a longitudinal axis; the bore including an centering section adjacent to a chamfer section which is adjacent to an outflow section; the centering section including a centering surface and a centering diameter; the chamfer section including a chamfer surface and a chamfer angle; the outflow section including an outflow surface and an outflow diameter.

Yet another embodiment is a process of chamfering a cored and cleaved optical fiber by rotating the fiber in contact with a herein described chamfering tool.

BRIEF DESCRIPTION OF THE FIGURES

For a more complete understanding of the disclosure, reference should be made to the following detailed description and accompanying drawing figures wherein:

FIG. 1 depicts a modified fiber scoring wafer that incorporates an embodiment of the invention in a top view FIG. 1A with detail FIG. 1B and cross-sectional view FIG. 1C with detail FIG. 1D;

FIG. 4 depicts a fiber inserted into an alternative embodiment (FIG. 4A) of the chamfering element 10 in FIG. 2 where FIG. 4B provides some detail and FIG. 4C provides greater detail;

FIG. 5 depicts a scheme for construction of a low cost chamfering die such as depicted in FIG. 3, where FIG. 5A is a side view of a blank aluminum cylinder, FIG. 5B is the cylinder after precision boring, FIG. 5C is an isometric view after anodization and FIG. 5D is the completed die in partial cross-section;

FIG. 6 depicts a side view of a prior art thermally "chamfered" fiber FIG. 6A in comparison to a side view of the fiber FIG. 6B produced using a chamfering tool such as disclosed here, with detail FIG. 6C;

FIG. 7 depicts a side view FIG. 7A and top view FIG. 7B of a universal chamfering tool for optical fiber embodiment of the invention; and FIG. 8 depicts a side view FIG. 8A of a chamfering tool and an expanded view FIG. 8B of the bore through the chamfering body.

Figure 2:
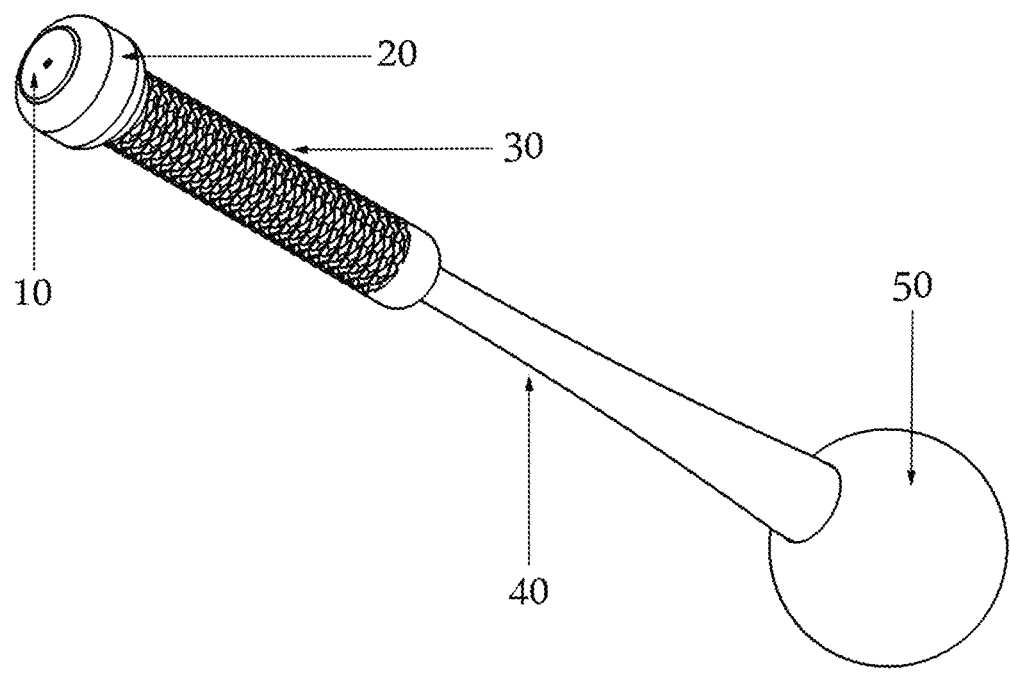
FIG. 2 depicts a preferred embodiment of a single fiber size chamfering tool designed for ease of use in intraoperative fiber tip reprocessing.

While specific embodiments are illustrated in the figures, with the understanding that the disclosure is intended to be illustrative, these embodiments are not intended to limit the invention described and illustrated herein.

DETAILED DESCRIPTION

The invention disclosed herein provides an easy to use tool for chamfering the edges of freshly cut optical fiber, incapable of extending the chamfer into the fiber core and that is compatible with multiple sterilization methods.

FIG. 1 illustrates a ceramic (e.g. alumina) wafer tool for scoring and chamfering laser surgical fibers, in this case standard fiber sizes used in laser lithotripsy The maximum core, minimum cladding, and maximum coating dimensions of standard fibers used in laser lithotripsy are detailed in Table 1, below. Herein, these dimensions are limiting for the chamfering tool. The minimum cladding thickness is not a function of the minimum cladding dimension and the maximum core dimension, but rather it is a function of the minimum cladding to core diameter ratio and the minimum cladding diameter. As such, the typical cladding thickness is offered for reference.

Fiber scoring wafers (aka cleaving tiles) are ubiquitous in the laser surgical marketplace. Logo marked wafers are often used as promotional items at tradeshows and symposia. FIG. 1 illustrates a "two inch" scoring wafer that is marked with a company logo, product name and slogan as well as a metric rule as a convenient reference in tip preparation. The depicted scoring wafer includes five chamfering holes 100 which correspond to each of five standard (nominal) fiber sizes: 200, 273, 365, 550 and 910.

TABLE 1

Critical Fiber Dimensions (millimeters)

| Fiber Core Max | Fiber Cladding Min | Fiber Coating Max | Clad Thickness |
|---|---|---|---|
| 0.208 | 0.235 | 0.278 | 0.020 |
| 0.283 | 0.294 | 0.335 | 0.014 |
| 0.373 | 0.392 | 0.438 | 0.018 |
| 0.562 | 0.590 | 0.640 | 0.025 |
| 0.940 | 0.985 | 1.050 | 0.040 |

FIG. 1A illustrates a possible location of the chamfering holes 100 on the wafer 110 with FIG. 1B providing a detail view of the holes with hole size identifiers: 200, 273, 365, 550 and 910. FIG. 10 provides a reference for the cross-section hole detail drawing FIG. 1D where the hole sizes are again identified as 200 for the 200 µm fiber hole, 273 for the 273 µm fiber hole, 365 for the 365 µm fiber hole, 550 for the 550 µm fiber hole and 910 for the 910 µm fiber hole.

The most challenging fiber dimension for chamfering is the 273 µm core; it has the thinnest cladding at 14 µm, so this hole is chosen for illustrative dimensioning. The chamfer stop bore 290 for the 273 µm core fiber is approximately 285 µm to 290 µm or slightly larger than the largest possible fiber core that is produced within standard manufacturing tolerances. The fiber centering bore 345 for the 273 µm fiber is approximately 340 µm to 345 µm in diameter or slightly larger than the fiber coating diameter. The two bore diameters are joined by a 30° to 120° included angle chamfering surface.

Partial rotation, reverse and repeat can be sufficient to chamfer the fiber in the operating room but such a chamfering wafer may find more utility in interoperative reprocessing where fibers may be easily rotated relative to a stationary wafer. Intraoperative reprocessing with the wafer 100 depicted in FIG. 1 may prove more difficult because fibers are typically attached to the laser console at one end and resist rotation. For intraoperative fiber reprocessing, a chamfering tool (e.g., FIG. 2) designed for single hand operation, with a rotating ball 50 for the palm, an extension handle 40, a knurled portion 30 for finger rotation, a housing 20 and a centrosymmetric chamfering die 10 is likely preferable. The die housing 20 may be adapted for quick die swapping (e.g., 20 or a combination of 20 and 30 akin to a replaceable tip screwdriver) to accommodate different fiber sizes or separate whole tools may be provided.

Figure 3:
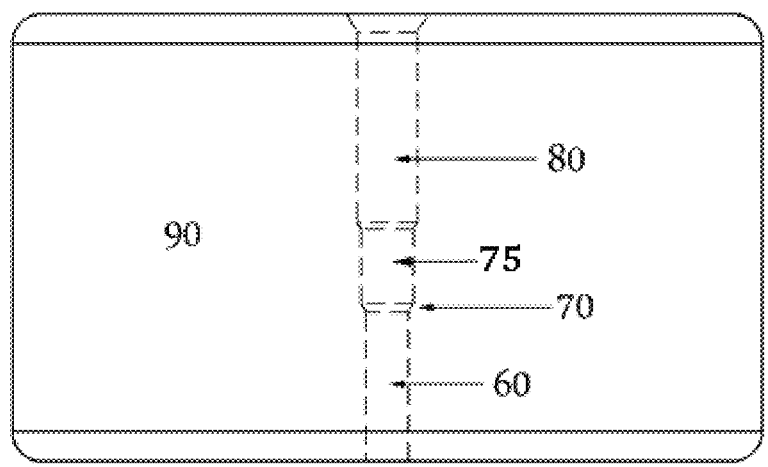
FIG. 3 is a cross-sectional side view detail of the chamfering element 10 in FIG. 2.

FIG. 3 shows a detailed view of a preferred embodiment of a chamfering die 90 made from anodized aluminum, with a fiber guide bore 80 leading to the precise fiber coating accommodating bore 75 and conical chamfering surface 70. The precise bore 60 is slightly larger than the maximum fiber core diameter and can collect the fine silica dust produced by the chamfering operation. The most challenging fiber size of 273 µm core is illustrated where bore 60 is 285 µm to 290 µm or slightly larger than the largest possible fiber core that is produced within standard fiber manufacturing tolerances. The precision fiber centering bore 75 for the 273 µm fiber is approximately 340 to µm 345 µm in diameter or slightly larger than the fiber coating diameter. The fiber guide bore 80 can be approximately 400 µm in diameter.

It may be desirable to limit the length of the precision fiber centering bore 75, as illustrated, to reduce the length of fiber that may incur coating damage to that very near the fiber output surface. Approximately 0.5 mm to 1 mm of close-fitting centering bore 75 is sufficient for insuring the sharp edge of the cleaved fiber is properly positioned upon the chamfer surface 70. This length is typically burned bare of coating in production fibers, so failures due to fractures from scratching is this short section of fiber should not increase the frequency or severity over historical levels.

FIG. 4 depicts a typical jacketed laser surgical fiber 110 with a short stripped section 120 that is inserted into an alternative embodiment of a chamfering die 130 where the die 130 is a modified tungsten carbide wire drawing die with a classically filleted lead-in 140. Rather than terminate in a precision bore 160, chosen to be slightly larger than the fiber core 200, as in a standard wire drawing die, upon a second, larger bore 150 that is slightly larger than the fiber coating 170 maximum diameter, is produced within the filleted lead-in. The fiber plastic coating 170 and glass cladding 180 are depicted after being chamfered and slightly offset from the chamfering surface 190. The die 130 may be mounted within a hand tool similar to that depicted in FIG. 2.

FIG. 5 illustrates production steps for fabricating a fiber chamfering die similar to that depicted in FIG. 3 where FIG. 5A is a chamfered aluminum cylinder 210 that is roughly 5 mm in diameter and 3 mm tall. In FIG. 5B the aluminum cylinder 220 has been equipped with precisely dimensioned bores: a bore slightly larger than a 200 µm fiber's core maximum dimension 230 and a bore slightly larger than the fiber coating dimensions 240 (see Table 1 for critical dimensions). A chamfer 250 joins the two bores. FIG. 5C illustrates the aluminum cylinder 260 after thin film anodization 265 (dark). FIG. 5D depicts a counterbored 270 and chamfered 275 fiber lead-in produced post anodization leaving the fiber chamfer surface 280 anodized. Boring the fiber lead-in after anodization reduces the risk of inadvertent damage being imparted to the inserted portion of the fiber not involved in centering the fiber.

FIG. 6A is a depiction of a "chamfered fiber" from prior art where the fiber core 300 and cladding 305 are melted by one of various means to fillet 310 the sharp edge that results from cleaving, in this case for passing through plastic tubes used in DNA/RNA cassettes or small diameter catheters. It should be noted that the filleting 310 extends through the glass cladding 305 and well into the fiber core 300. While laser filleting can be performed without extending curvature into the fiber core, maintaining a perfectly flat fiber face is relatively difficult when using thermal methods.

FIG. 6B and detail FIG. 6C reproduce the fiber tip of FIG. 4 for direct comparison to the prior art. FIG. 6B presents the fiber core 315 with glass cladding 320 with the plastic coating (ala hard polymer cladding) 325 intact but the thick polymer coating 330 stripped away. The fiber tip FIG. 6C detail shows that the chamfer 355 only affects the fiber coating 350 and glass cladding 340, leaving the fiber core 335 with the flat, snap-cut face.

FIG. 7 illustrates a universal chamfering tool embodiment where smaller fibers pass freely through the chamfering tool segments for larger fibers. For orientation, the insertion side 33 is "up" or out of the page in the top view of FIG. 7B and "up" is to the right in FIG. 7A, the view from the side 99 of the universal die. A 200 µm core fiber would pass down through the 910 µm fiber centering bore 91 and the 910 µm fiber chamfering surface 91' immediately below, through the 910 µm fiber chamfer stop bore 94 and associated non-tool chamfer 84, into the 550 µm fiber centering bore 55 and the 550 µm fiber chamfering surface 55' immediately below, into the 550 µm fiber chamfer stop bore 54 and associated non-tool chamfer 44, into the 365 µm fiber centering bore 36 and the 365 µm fiber chamfering surface 36' immediately below, into the 273 µm centering bore 27 that serves a dual role as the 365 µm fiber stop bore and through the 273 µm fiber chamfering surface 27' immediately below that, and finally into the 200 µm fiber centering bore 2 that serves a dual role as the 273 µm fiber stop bore, it's 200 µm fiber chamfering surface 2' and the 200 µm fiber stop bore 1.

FIG. 8 illustrates another embodiment having a conical procession leading to a first centering section. In one example, the chamfering tool includes a chamfering body 1 defining a bore 2 that is centrosymmetric about a longitudinal axis 3. The bore 2 can include a centering section 4 adjacent to a chamfer section 5 which is adjacent to an outflow section 6. Notably, the centering section 4 can include a centering surface 7 and a centering diameter 8. The chamfer section 5 including a chamfer surface 9 and a chamfer angle 10. Where the chamfer angle is the deflection from the longitudinal axis 3. The outflow section 6 includes an outflow surface 11 and an outflow diameter 12.

In one instance, the chamfering body 1 is composed of or includes alumina, aluminum, tungsten carbide, stainless steel, or titanium. In one preferable example, the chamfering body comprises alumina. In another preferable example, the chamfering body 1 comprises aluminum and the chamfer surface 9 comprises anodized aluminum. In another instance, the chamfering body 1 can be held within a support composed of the same or different composition as the chamfering body (see e.g., FIG. 2).

In another instance, the chamfering tool includes a bore surface that includes the centering surface 7, the chamfer surface 9, and the outflow surface 11. In one example, the bore surface can be composed of an alumina, a zirconia, a diamond, a tungsten carbide, a titanium dioxide, a boron nitride, a boron carbide, or a silicon carbide. In another example, the bore surface is composed of a material with hardness greater than the hardness of the fiber core. In one preferable example, the chamfer surface 9 is composed of an alumina, a zirconia, a diamond, a tungsten carbide, a titanium dioxide, a boron nitride, a boron carbide, or a silicon carbide. In another preferable example, the chamfer surface 9 has a surface hardness of at least 20 GPa. In yet another preferable example, the centering surface 7 can have a roughness average (Ra) of less than about 0.025 µm, about 0.05 µm, about 0.75 µm, about 0.1 µm, about 0.15 µm, or about 0.2 µm; preferably less than about 0.025 µm, about 0.05 µm, about 0.75 µm, or about 0.1 µm. In still another preferable example, the chamfer surface 9 has a roughness average that is greater than the centering surface 7 roughness on average.

In another instance, the centering diameter is selected to correspond to the nominal diameter of an optical fiber. The five standard optical fibers have nominal diameters of 200, 273, 365, 550 and 910 µm. In one example, the centering diameter can be about 285 µm to 295 µm for a 200 µm fiber; about 340 µm to 350 µm for a 273 µm fiber; about 445 µm to 455 µm for a 365 µm fiber; about 645 µm to 655 µm for a 550 µm fiber; or about 1055 µm to 1075 µm for a 910 µm fiber. In an example wherein the chamfering tool includes a plurality of bores (e.g., FIG. 1), the centering diameters can be have the same or different centering diameters, each selected from about 285 µm to 295 µm for a 200 µm fiber; about 340 µm to 350 µm for a 273 µm fiber; about 445 µm to 455 µm for a 365 µm fiber; about 645 µm to 655 µm for a 550 µm fiber; and about 1055 µm to 1075 µm for a 910 µm fiber.

In another example, the chamfering tool can include a single bore that can be utilized to chamfer fibers of differing diameter (e.g., FIG. 7), the bore may include at least two centering diameters selected from about 285 µm to 295 µm for a 200 µm fiber; about 340 µm to 350 µm for a 273 µm fiber; about 445 µm to 455 µm for a 365 µm fiber; about 645 µm to 655 µm for a 550 µm fiber; and about 1055 µm to 1075 µm for a 910 µm fiber. In one instance, the chamfering body defines a plurality of bores that are individually centrosymmetric about longitudinal axes; each bore including an centering section (e.g., 36) adjacent to a chamfer section (e.g., 36') which is adjacent to an outflow section (e.g., 27); each centering section including a centering surface and a centering diameter; each chamfer section including a chamfer surface and a chamfer angle; each outflow section including an outflow surface and an outflow diameter. In this instance, each bore can have a centering diameter selected from about 285 µm to 295 µm for a 200 µm fiber; about 340 µm to 350 µm for a 273 µm fiber; about 445 µm to 455 µm for a 365 µm fiber; about 645 µm to 655 µm for a 550 µm fiber; and about 1055 µm to 1075 µm for a 910 µm fiber. By way of example, FIG. 7A depicts a chamfering tool having a single bore with a plurality of axially symmetric chamfering regions/sections. In one example, chamfering regions can overlap; for example, the tool can include a first region and a second region, for example for a 200 µm fiber and a 273 µm fiber, respectively. In this example, the first region includes an outflow section 2, a chamfer surface 27', and a centering section 27; the second region includes an outflow section 27 which overlaps with or is identical to the first region's centering section, a chamfer surface 36', and a centering section 36. In another example, the chamfering regions can be separated by a reducing chamfer; for example, the first region includes an outflow section 54, a chamfer surface 55', and a centering section 55; the second region includes an outflow section 94, a chamfer surface 91', and a centering section 91. These two regions are separated by a reducing chamfer 84. In still another example, the tool can include a plurality of regions wherein first and second regions have centering and outflow regions that overlap and wherein a third region is divided from another region (e.g., the second region or a fourth region) by a reducing chamfer.

In another instance, the chamfer angle is about 23° to about 68°, preferably about 34° to about 56°, In a preferable instance, the chamfer angle is about 45°±5°.

In yet another instance, the outflow section can include an outflow diameter that is approximately equal to or slightly larger than the nominal fiber diameter. In one example, the outflow diameter can be selected from about 210 µm to 220 µm for a 200 µm fiber; about 285 µm to 295 µm for a 273 µm fiber; about 375 µm to 385 µm for a 365 µm fiber; about 565 μm to 575 μm for a 550 μm fiber; and about 945 μm to 960 μm for a 910 μm fiber. In another example, the outflow diameter is about 10 μm to about 50 μm greater than a nominal fiber diameter, preferably, about 10 μm to about 35 μm greater than a nominal fiber diameter.

Yet another embodiment is a process of using the above described chamfering tool to provide a chamfer on a cleaved optical fiber. The process can include providing the chamfering tool, and rotating the fiber or chamfering tool in relation to the other, thereby chamfering the cleaved surface of the optical fiber.

What is claimed:

1. A process for chamfering an optical fiber with a chamfering tool,
the optical fiber having a glass fiber core with a core diameter, a glass fiber cladding with an outer glass cladding diameter, a first cleaved end and a second end,
the chamfering tool having a body and a bore within said body, the bore having an axis,
the process comprising:
inserting the first cleaved end of the optical fiber into said bore through a first cylindrical portion thereof,
wherein said bore has the following coaxial portions:
the first cylindrical portion having a first diameter larger than said outer glass cladding diameter,
a second cylindrical portion having a second diameter that is smaller than the first diameter, smaller than the outer cladding diameter, and larger than the core diameter, and
a conical portion including a first base that has the first diameter and a second base that has the second diameter, said conical portion connecting the first and second cylindrical portions,
moving said optical fiber through said first cylindrical portion and along the conical portion towards the second cylindrical portion to form a contact between said first cleaved end and a surface of the conical portion;
chamfering the glass fiber cladding by rotating at least one of the conical portion and the optical fiber about the axis in contact with and with respect to the other of the conical portion and the optical fiber while preventing the glass fiber core from being chamfered due to a dimensional mismatch between the second diameter and the glass fiber core diameter, to form a modified first cleaved end in which a chamfered surface is confined to the glass cladding at said modified first cleaved end;
and
removing said modified first cleaved end from the bore.

2. The process according to claim 1,
wherein said rotating includes rotating said body, having a cylindrical outer surface removably inserted in a housing with a first portion including a knurled outer surface and a ball portion connected to the first portion via a handle, by placing the ball portion against a palm of a hand and twisting fingers in contact with the knurled outer surface.

3. The process according to claim 1, wherein the body contains
an auxiliary bore therein, said auxiliary bore having an auxiliary axis and including an auxiliary first cylindrical portion having an auxiliary first diameter;
an auxiliary second cylindrical portion having an auxiliary second diameter that is smaller than the auxiliary first diameter; and
an auxiliary conical portion uninterruptingly connecting said auxiliary first cylindrical portion with said auxiliary second cylindrical portion,
wherein the auxiliary first diameter is different from the first diameter and the auxiliary second diameter is different from the second diameter.

4. The process according to claim 1, comprising
removing the body from a housing of the chamfering tool, and
inserting an auxiliary body in said housing instead of said body, the auxiliary body having an auxiliary bore dimensioned to accommodate an auxiliary first cleaved end of an auxiliary optical fiber having an auxiliary glass fiber core with an auxiliary core diameter, an auxiliary glass fiber cladding with an auxiliary outer cladding diameter, the auxiliary first cleaved end and an auxiliary second end,
wherein an auxiliary cladding diameter of the auxiliary optical fiber differs from the auxiliary outer cladding diameter,
wherein the auxiliary bore has the following coaxial portions:
a first auxiliary cylindrical portion having a first auxiliary diameter larger than said auxiliary outer cladding diameter,
a second auxiliary cylindrical portion having a second auxiliary diameter that is smaller than the first auxiliary diameter, smaller than the auxiliary outer cladding diameter, and larger than the auxiliary core diameter, and
an auxiliary conical portion including a first auxiliary base that has the first auxiliary diameter and a second auxiliary base that has the second auxiliary diameter, said auxiliary conical portion connecting the first and second auxiliary cylindrical portions.

5. The process according to claim 1, wherein said rotating includes rotating said body with respect to the first cleaved end while the second end is attached to a laser console and resists rotation.

6. The process according to claim 1, comprising
prior to said inserting, transferring said first cleaved end through and beyond at least two auxiliary bores that are coaxial with said bore, an auxiliary bore from the at least two auxiliary bores including
an auxiliary first cylindrical portion having an auxiliary first diameter that is larger than said first diameter, and
an auxiliary conical portion coaxially connected with said auxiliary first cylindrical portion.

7. The process according to claim 1, wherein said chamfering includes confining a chambered surface to said glass cladding having a thickness between 14 microns and 45 microns while the glass fiber core diameter is between 200 microns and 910 microns.

* * * * *